A. AFABLE.
TIRE PROTECTOR.
APPLICATION FILED JAN. 6, 1919.

1,305,957.

Patented June 3, 1919.
2 SHEETS—SHEET 1.

Witnesses

K. A. Thomas

Inventor
Agapito Afable

By Victor J. Evans
Attorney

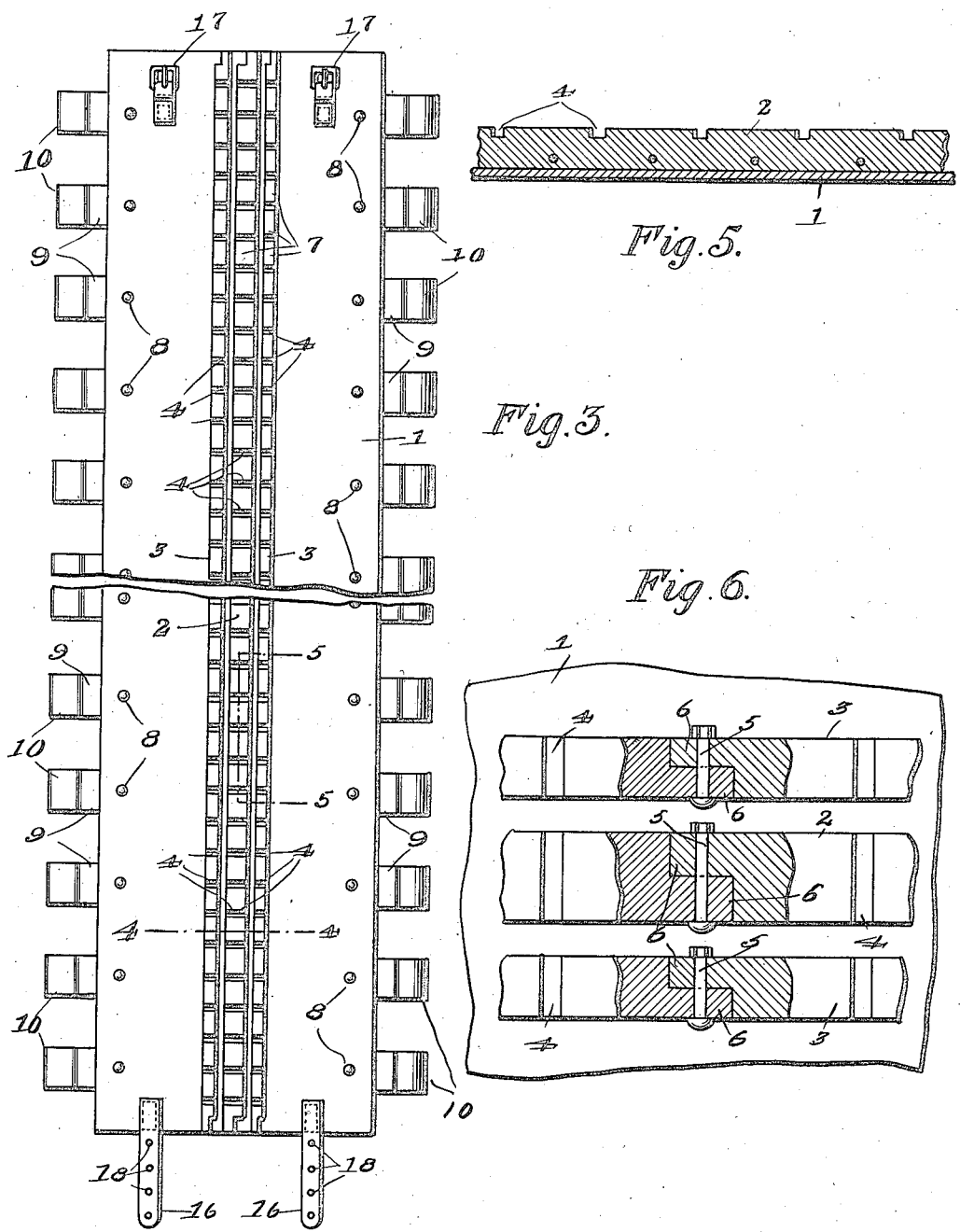

UNITED STATES PATENT OFFICE.

AGAPITO AFABLE, OF MANILA, PHILIPPINE ISLANDS.

TIRE-PROTECTOR.

1,305,957. Specification of Letters Patent. Patented June 3, 1919.

Application filed January 6, 1919. Serial No. 269,884.

*To all whom it may concern:*

Be it known that I, AGAPITO AFABLE, a citizen of the United States, residing at Manila, in the Philippine Islands, have invented new and useful Improvements in Tire-Protectors, of which the following is a specification.

This invention relates to pneumatic tire protectors, the broad object in view being to provide an efficient protector adapted to be placed around the outer casings of pneumatic tires to eliminate a greater portion of the wear thereon by preventing such tires from coming in actual wearing contact with the road surface over which the machine is traveling.

A further object of the invention is to provide a protector which will practically eliminate punctures and so strengthen and reinforce the outer casing that blow outs are almost impossible.

A further object of the invention is to provide a protector for pneumatic tires which will do away with what is known as the non-skid outer casing, the protector of this invention being adapted to be used in connection with and upon what is known as a smooth tread outer casing which may be purchased at a comparatively low cost.

A further object of the invention is to provide a protector of the class described having the necessary tractive properties to enable a firm and effective grip to be obtained on the road surface to insure traction of the machine and the propulsion of the same over any kind of road surface, whether dry or wet, or covered with ice, snow or sleet.

With the above and other objects in view, the invention consists in the construction, combination and arrangement of parts, as herein described, illustrated and claimed.

In the accompanying drawings:

Fig. 3 is a plan view of the complete protector spread out flat.

Fig. 5 is an enlarged fragmentary longitudinal section on the line 5—5 of Fig. 3.

Fig. 6 is an enlarged fragmentary plan view illustrating the connections between the extremities of the traction strips.

Figure 1:
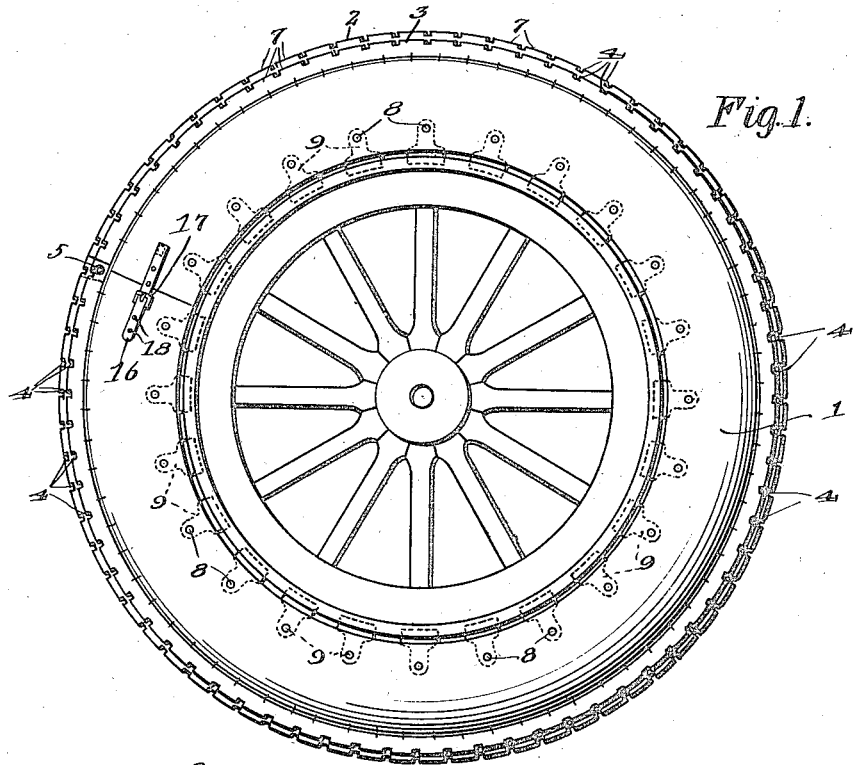
Figure 1 is a side elevation showing the protector applied to a vehicle wheel and pneumatic tire.
Figure 2:
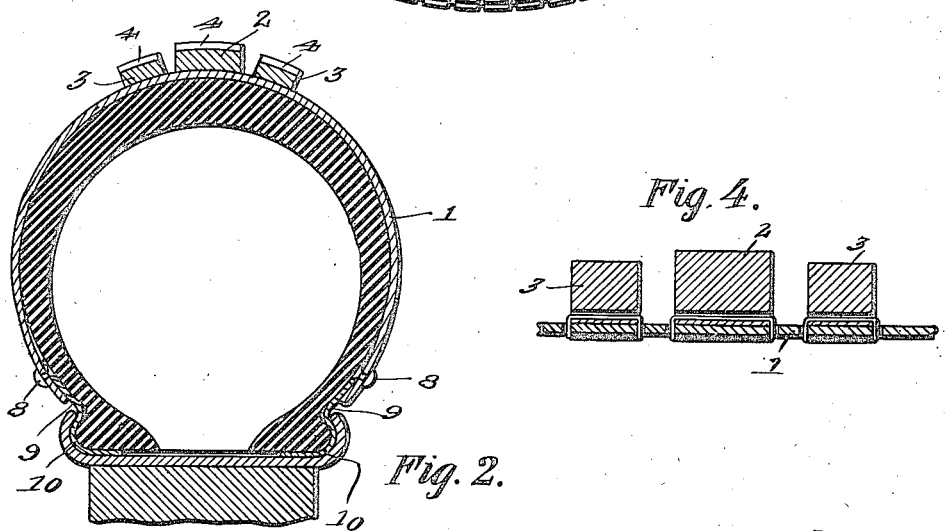
Fig. 2 is a transverse section through the same.
Figure 4:
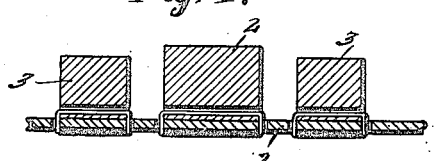
Fig. 4 is an enlarged fragmentary transverse section on the line 4—4 of Fig. 3.

The protector contemplated in this invention comprises a main body or strip-like sheet 1 of flexible material, such as leather or heavy fabric, which may be combined with rubber and vulcanized if desired to any proper degree so as not to interfere with a high degree of flexibility. The size of the body 1 will, of course, vary both longitudinally and transversely in accordance with the size of the tire in conjunction with which the protector is used, said body being of sufficient length to extend entirely around the circumference of the tire and being of sufficient width to extend transversely around the tire to a point in close proximity to the marginal edges of the vehicle wheel rim upon which the tire and protector are mounted. This enables the protector to cover the entire exposed surface of the tire which it is designed to protect.

Extending centrally and longitudinally of the outer surface of the body 1 of the protector is a plurality of metal tread strips, 2 designating a central tread strip, and 3 other tread strips arranged in parallel but spaced relation to the central tread strip 2 and at opposite sides of the latter. Each of said tread strips is formed of malleable steel or iron, or the equivalent thereof, so that it will easily bend when required without breaking. In order to add to the flexibility of the tread strips 2 and 3, they are formed in their outer or road contacting surfaces with transversely extending channels, grooves or depressions, and it will be noted in Fig. 3, that such channels or grooves are arranged in transverse alinement with each other, there being as many of such channels in the side strips 3 as there are in the center strip 2. The channels 4 not only increase the flexibility of the tread strips but they also provide the necessary traction in negotiating hills and wet or slippery tread surfaces. By arranging the tread strips 2 and 3 in laterally spaced relation to each other, side slipping is prevented. This makes the protector very safe and reliable when applied to the tire of a motor vehicle.

The opposite extremities of the tread strips 2 and 3 are adapted to be connected together when the protector as a whole, is applied to a tire by means of fasteners 5, shown in the form of screws or bolts which are inserted through reduced and overlapping portions or tongues 6 of the respective strips as shown in Fig. 6, the pins or fasteners 5 of the several tread strips are arranged in transverse alinement with each other as shown so that no twisting or torsional strains are imposed thereon. The tread strips are provided with transverse notches forming therebetween calks 7 which better insure the traction.

Pivotally secured, as at 8 to the side portions of the body 1 are metallic plates 9, each of the said plates having its outer end bent upon itself to provide a hook 10, and these hooks are designed to be inserted between the edge of the tire and the rim of the wheel, as clearly illustrated by the drawings. The hooks being pivoted permit of the same being easily positioned between the edge of the tire and the rim of the wheel and also permit of the tread properly adjusting itself in engaging position on the tire.

The body 1 is also provided at the opposite extremities thereof with securely attached straps 16 having buckles 17 and eyes 18, enabling the body 1 of the protector to be tightly stretched circumferentially around the outer casing of the tire.

In the preferred embodiment of the invention, the thickness and width of the center tread strip 2 are both greater than the corresponding thickness and width of the side tread strips 3 as illustrated in the drawings, the greatest wear and load being, of course, imposed on the center strip. For example, if the side strips are one-half inch in width and one-half inch in thickness the center strip will probably be made nine-sixteenths of an inch in thickness and three-fourths of an inch in width. I do not desire to be restricted, however, to the dimensions just stated, it being important, however, to have the center tread strip of greater thickness and preferably of greater width than the corresponding connections of the side tread strips 3.

The tire protector hereinabove described will increase the life and durability of a pneumatic tire several fold, and will render it unnecessary to import such vast quantities of rubber for the manufacture of pneumatic tires. The cost of manufacture of the improved tire protector is comparatively low and may be placed on the market at a price within the reach of all owners of motor vehicles. In the initial manufacture of the body 1 of the protector, a flat sheet of material may be used. Such sheet may be moistened or dampened and stretched over a suitable form or mandrel and brought into proper shape to conform to the circumference and transverse rotundity of the tire before being placed upon the market, this being left to the will of the manufacturer.

It will be further seen that the protector, as a whole, is susceptible of various changes in the form, proportion and minor details of construction which may accordingly be resorted to without departing from the principle or sacrificing any of the advantages of the invention.

Having thus described the invention, what is claimed as new, is:—

1. A tire protector comprising a strip-like body of flexible material, means attached to said body for securing the same around a tire and also fastening said body in fixed relation to a vehicle, and a plurality of malleable tread strips secured to said body and extending centrally and longitudinally thereof, said tread strips being arranged in spaced and parallel relation to each other, and formed with transversely alined channels in their outer faces.

2. A tire protector comprising a strip-like body of flexible material, means attached to said body for securing the same around a tire and also fastening said body in fixed relation to a vehicle, a plurality of malleable tread strips secured to said body and extending centrally and longitudinally thereof, said tread strips being arranged in spaced and parallel relation to each other, and means for flexibly connecting the extremities of said tread strips.

In testimony whereof I affix my signature.

AGAPITO AFABLE.